Feb. 6, 1934.  J. L. CREVELING  1,946,064
LUBRICATING DEVICE
Filed Feb. 8, 1932
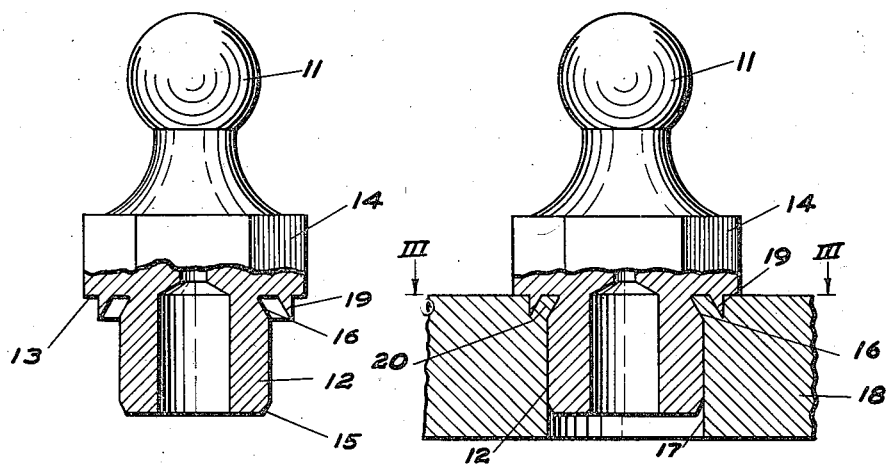
Fig. 1.  Fig. 2.
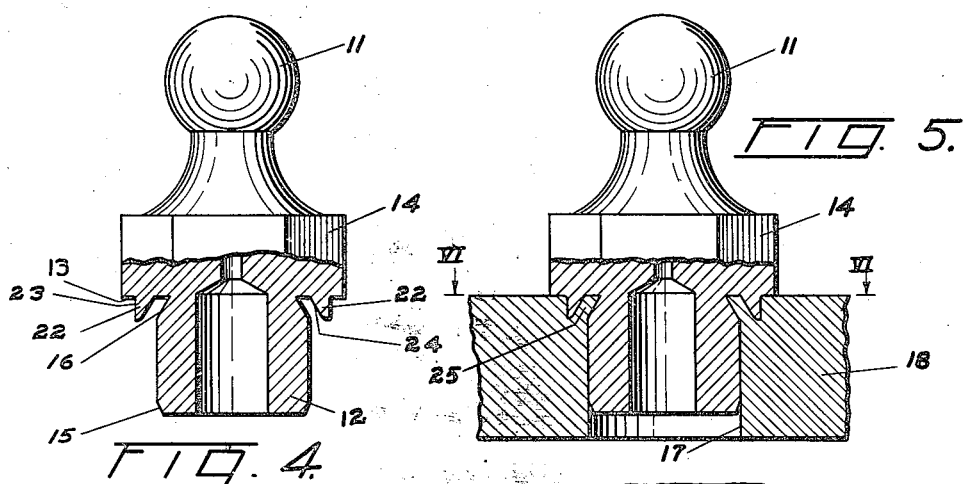
Fig. 5.
Fig. 4.
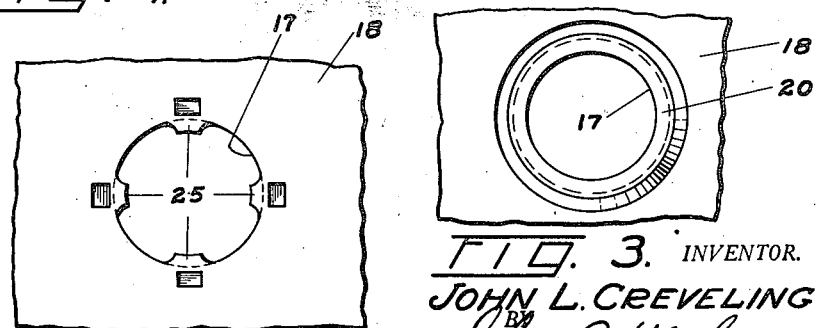
Fig. 6.  Fig. 3.
INVENTOR.
JOHN L. CREVELING
BY
ATTORNEY.

Patented Feb. 6, 1934

1,946,064

UNITED STATES PATENT OFFICE 1,946,064

LUBRICATING DEVICE

John L. Creveling, near Tucson, Ariz., assignor to The Lubrication Corporation, South Bend, Ind., a corporation of Delaware Application February 8, 1932. Serial No. 591,621

5 Claims. (Cl. 285—25)

This invention relates to lubrication devices and, particularly, lubrication fittings or nipples of the drive type wherein the fitting is secured to the bearing or receiving member by driving the shank of the fitting into a preformed bore or recess in the receiving member.

An object of the invention is to provide a fitting in which the shank when admitted and driven into a preformed bore or recess simultaneously causes the flow of metal at the mouth of the recess to a region within the mean diameter of the admitted fitting shank.

Another object is to provide a lubrication fitting of the drive type which, when secured in place, affords an unusually tight seal between fitting and receiving member, the contacting surfaces of which define a tortuous path.

Another object is to provide a lubrication fitting of the drive type which may be installed with a minimum amount of driving force applied thereto.

Other objects and advantages will become hereinafter apparent upon reading the following specification wherein reference is made to the accompanying drawing, in which:

Fig. 1 is an elevation, partly in section, of my improved fitting;

Fig. 2 is a part sectional elevation illustrating the fitting installed;

Fig. 3 is a view along the line III—III of Fig. 2, but with the fitting omitted;

Fig. 4 is a part sectional elevation of a modified form of the fitting;

Fig. 5 is a part sectional elevation illustrating the fitting of Fig. 4 installed, and Fig. 6 is a view along the line VI—VI of Fig. 5, but with the fitting omitted.

A drive fitting or nipple of the ball head type for lubrication purposes has been selected for illustration herein, but it will be apparent that the invention may be equally as well applied to rivets, binder pins, terminal posts, or any structure wherein a member is to be secured to another member by driving the shank of one of the members into a preformed bore or recess in the other.

With reference to Figs. 1, 2 and 3, I have illustrated therein one embodiment of the invention as applied to a fitting intended for lubrication purposes. The fitting is formed with a ball head 11 for engagement by direct contact with a metal lubricant feeder nozzle, and a shank 12 for introduction by drive fit into the bore or recess 17 of a body 18, as for instance the wall of a bearing to be lubricated.

The intermediate body portion 14 of the fitting is of greater diameter than the shank 12 and its under surface constitutes a shoulder 13 disposed in a plane perpendicular to the axis of the shank. The function of the shoulder 13 is that of abutment with the upper surface of the receiving member 18 into which the fitting is driven, as shown in Fig. 2.

In the embodiment illustrated herein, the intermediate body 14 of the fitting is shown as having hexagonal cross-section so as to fit the jaws of the conventional type of mechanic's wrench, to permit, if desired, the turning of the fitting prior to withdrawal.

In order to facilitate the initial entry of the shank 12 into the passage 17, the lower end of the shank is slightly chamfered as shown at 15.

An annular depression 16 is formed at the top of the shank 12, one wall of which is defined by the shoulder 13 and the other wall of which is inclined with respect to the axis of the shank and extends from the outer surface of the shank to the inner edge of the shoulder.

Means for forcing a sub-portion 20 of the metal 18, immediately about the mouth of the recess 17, into the depression 16 during the driving of the fitting, as described, for interlocking the fitting and receiving member, comprises an annular projection on the perpendicular shoulder 13 concentric with the shank 12 and having its inner wall parallel to the inclined and opposed wall of the depression 16. The remaining side of the projection is parallel and concentric to the axis of the fitting and to the outer wall of the shank. The projection, when viewed in cross-section (see Fig. 1) follows the contour of a right triangle.

In assembling the fitting in the recess 17, the chamfered end 15 of the shank is first aligned with the mouth of the recess and a blow or series of blows is struck upon the body 14 from above and along the axis of the shank. A tubular driving tool and mechanic's hammer may be employed for this purpose. When the lowermost edge of the annular projection 19, which comprises a sharp annular ridge, engages with the metal of the bearing or receiving member 18, as the fitting is driven downwardly, it is caused to enter the metal and forcefully displace an annular sub-portion 20 thereof toward the axis of the shank and into the depression 16. Continued driving force applied results in tightly packing the metal between the opposed walls of the depression and the annular projection (see Fig. 2), to securely interlock the fitting with the receiving member upon which it is now supported.

Aside from the advantages gained by a tight

:hanical interlocking of fitting and receiving nber, the continuous contacting surfaces between the shoulder 13, projection 19, and depressed shank wall 16, and the receiving member, ow a highly tortuous path doubled back upon If at one point, thus providing a very efficient lubricant tight seal. This seal remains effective even though, through abuse, the fitting be ired and slightly free of close mechanical contact.

n Figs. 4, 5 and 6, I have illustrated a lubrition fitting embodying a modified form of the tal displacing projection. In other respects, fitting is identical with the fitting first described.

n this embodiment, instead of employing an illess annular projection 19, I provide four ally spaced-apart projections having their outwalls 23 parallel and concentric with the outer ll of the shank 12, and the inner walls 24 parall and concentric with the inclined wall of the nular depression 16. In this instance, because the limitation in size, the bases of the projecns 22 are made substantially wider, and the vermost portion or ridge is curved from the inned wall 24 to the perpendicular wall 23, so at the pitch of the wall 24 may be consistent th that of the inclined wall or surface of the pression 16 without necessitating an increase the depth of the projections.

In assembling this type of fitting in the recess of the receiving member, identically the same ocedure is employed as that in connection with e first embodiment described. As the lower ds of the projections engage with and enter e metal of the bearing or receiving member, adcent sub-portions 25 of the metal are forced wardly to occupy portions of equally spaced-)art regions of the annular depression 16 to seire a firm mechanical interlock between the fitag and its supporting receiving member. It is commended that this type of drive fitting be nployed where the metal of the receiving mem:r is less malleable than the metal ordinarily und in bearing members, shackles, etc., as it ill be apparent that less manual effort is reJired to secure a fitting of the type illustrated ι Figs. 4, 5 and 6, than that type illustrated in ıe first three figures of the drawing.

It is to be understood that the above embodiments of the invention are for the purpose of illustration only and various changes may be made ıerein without departing from the scope of the laims.

I claim:

1. A lubrication drive fitting, having a shank adapted to enter a preformed recess in a receiving member, said fitting being further formed with a depending projection arranged to enter and laterally displace metal of said receiving member as the shank is driven therein, said shank having a recess therein within the shadow of said projection.

2. A lubrication drive fitting, having a shank formed with a portion of minimum diameter intermediate its length, and means including a depending projection formed on said fitting for entering and displacing metal of a receiving member, into which said shank is driven, about and overhanging that portion of minimum diameter of said shank.

3. A lubrication drive fitting, adapted to interlock with a recessed receiving member when driven therein, and formed with a shank having a portion of its outer side wall tapered inwardly at an angle to the axis of the shank and another portion parallel with its axis, and means including a depending projection overhanging said tapered portion for partially severing and displacing a sub-portion of the receiving member against the tapered side wall of said shank as the fitting is driven into place, said projection forming a driving edge, one wall of which is substantially parallel to the tapered side wall of the shank.

4. A lubrication drive fitting, adapted to interlock with a recessed receiving member when driven therein, and formed with a shank having a portion of its outer side wall tapered inwardly at an angle to the axis of the shank and another portion parallel with its axis, and means including a depending projection overhanging said tapered portion for partially severing and displacing a sub-portion of the receiving member against the tapered side wall of said shank as the fitting is driven into place, said projection forming a driving edge, one wall of which is opposed and parallel to the tapered side wall of the shank, and having its other wall substantially parallel to the axis of the shank.

5. A lubrication drive fitting, having a shank formed with a portion of minimum diameter intermediate its length and means including a plurality of depending projections formed on said fitting for entering and displacing metal of a receiving member into which said shank is driven, toward and into interlocking relation with that portion of minimum diameter of said shank.

JOHN L. CREVELING.